United States Patent [19]

Nishikata et al.

[11] Patent Number: 4,458,422
[45] Date of Patent: Jul. 10, 1984

[54] HEIGHT GAUGE

[75] Inventors: Goro Nishikata; Tokuzo Nakaoki, both of Kawasaki, Japan

[73] Assignee: Mitutoyo Mfg. Co. Ltd., Tokyo, Japan

[21] Appl. No.: 376,977

[22] Filed: May 10, 1982

[30] Foreign Application Priority Data

May 22, 1981 [JP] Japan ................................ 56-77845
May 22, 1981 [JP] Japan ................................ 56-77846
May 26, 1981 [JP] Japan ................................ 56-79845

[51] Int. Cl.³ ............................ G01B 3/20; G01B 5/02
[52] U.S. Cl. ................................ 33/169 R; 33/172 R; 33/172 B
[58] Field of Search ............. 33/169 R, 172 R, 172 B, 33/189

[56] References Cited

U.S. PATENT DOCUMENTS

| | | | |
|---|---|---|---|
| 624,876 | 5/1899 | Sawyer | 33/169 R |
| 715,582 | 12/1902 | Jacobs et al. | 33/172 B |
| 2,627,118 | 2/1953 | Young | 33/172 B |
| 3,803,719 | 4/1974 | Nishina | 33/172 R |
| 3,864,834 | 2/1975 | Horton | 33/172 B |
| 4,251,922 | 2/1981 | Perlotto | 33/172 R |
| 4,284,257 | 8/1981 | Murkens | 33/172 R |

FOREIGN PATENT DOCUMENTS

| | | | |
|---|---|---|---|
| 900520 | 7/1945 | France | 33/172 R |
| 129705 | 10/1980 | Japan | 33/169 R |
| 230727 | 1/1944 | Switzerland | 33/169 R |
| 303313 | 11/1954 | Switzerland | 33/169 R |
| 147768 | 11/1962 | U.S.S.R. | 33/169 R |

OTHER PUBLICATIONS

*American Machinist*, "Dial Indicator Stand Permits Close Final Adjustments", Nov. 1949, p. 121.

Primary Examiner—Richard R. Stearns
Attorney, Agent, or Firm—Flynn, Thiel, Boutell & Tanis

[57] ABSTRACT

A height gauge is disclosed which rests on a surface plate and is used for measurement of dimensions and marking-off operations. Supports slidably supporting sliders are planted in rotary members rotatably provided on a base, and the measurement of dimensions and marking-off operations are performed in a state where the supports are held at inclinations by means of a locking device for preventing the rotary members from freely rotating.

14 Claims, 12 Drawing Figures

Prior Art
FIG. 1
FIG. 2
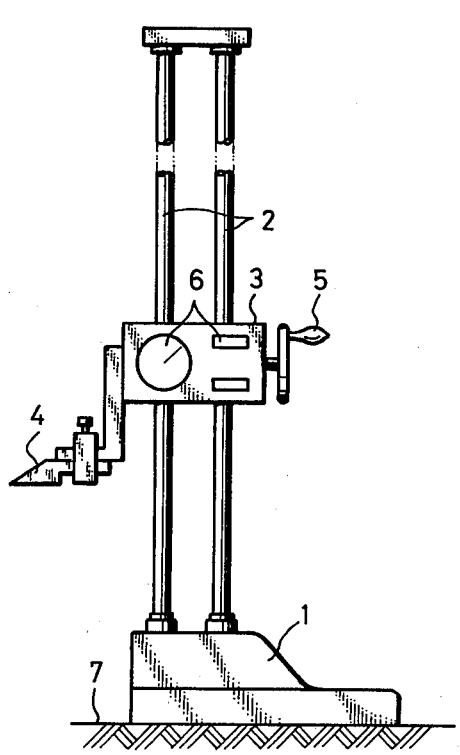
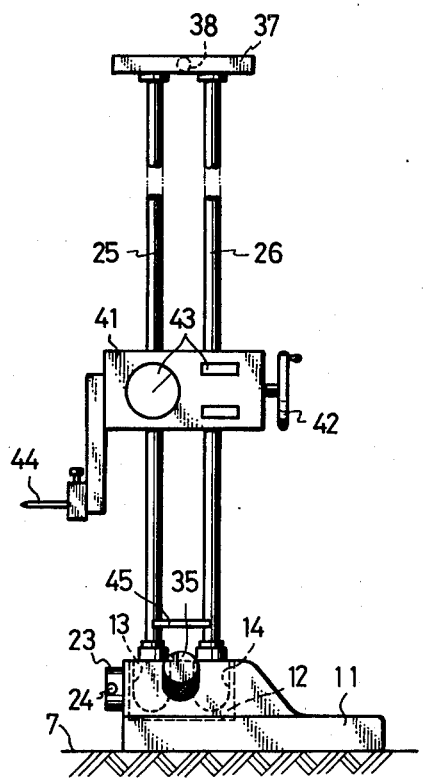

HEIGHT GAUGE

BACKGROUND OF THE INVENTION

1. Field of the Invention

This invention relates to a height gauge to be rested on a surface plate for measuring a height and for scribing.

2. Description of the Prior Art some conventional height measuring gauges have been of a design wherein, as shown in FIG. 1, a slider 3 is slidably provided on a support 2 vertically planted and affixed onto a base. A scriber 4 or a marking-off pin, not shown, is projectingly provided on this slider 3, the scriber 4 is vertically moved by means of a handle 5 and the height of the slider 3 is indicated by an indicator 6. In the drawing, a surface plate 7 is horizontally provided.

In the conventional height gauge of the type described, movements of the scriber 4 or a marking-off pin are limited to movement in only two directions, including a vertical movement due to the movement of the slider along the support 2 and a horizontal movement when the height gauge as a whole is caused to slide on the surface plate 7. In consequence, particularly in the marking-off work, when a base line making a certain angle with a desired base line is to be scribed, it has been necessary to use a sine bar or the like to affix a workpiece to the surface plate 7 in a manner inclined relative to the surface plate, so that the marking-off surface itself can be inclined at a predetermined angle. Because of this, very troublesome operations have been required. Further, since it is impossible, depending on the configuration of the workpiece, to rest the workpiece in various modes on the surface plate 7, the sine bar and the like as necessary, there are some cases where marking-off operations and measurements of dimensions are very difficult to perform.

Under the above-described circumstances, a need has been expressed for the provision of a novel device capable of readily performing marking-off operations and measurements of dimensions in a desired inclined direction without requiring the additional use of a sine bar, a rule or the like for determining an angle and an indexing device.

SUMMARY OF THE INVENTION

The present invention has as its object the provision of a novel height gauge capable of readily performing marking-off operations and measurements of dimensions even in an inclined direction.

To achieve the above-described object, the present invention contemplates that a support or supports slidably supporting a slider are planted in rotary members. These rotary members are rotatably provided on a base, the supports are held in an inclined manner on the base by means of a locking device, and the slider is made movable along the support or supports in the above-described condition.

BRIEF DESCRIPTION OF THE DRAWINGS

FIG. 1 is a front view showing the general arrangement of the conventional height gauge;

FIG. 2 is a front view showing the general arrangement of a first embodiment of the height gauge according to the present invention;

DESCRIPTION OF THE PREFERRED EMBODIMENTS

Figure 3:
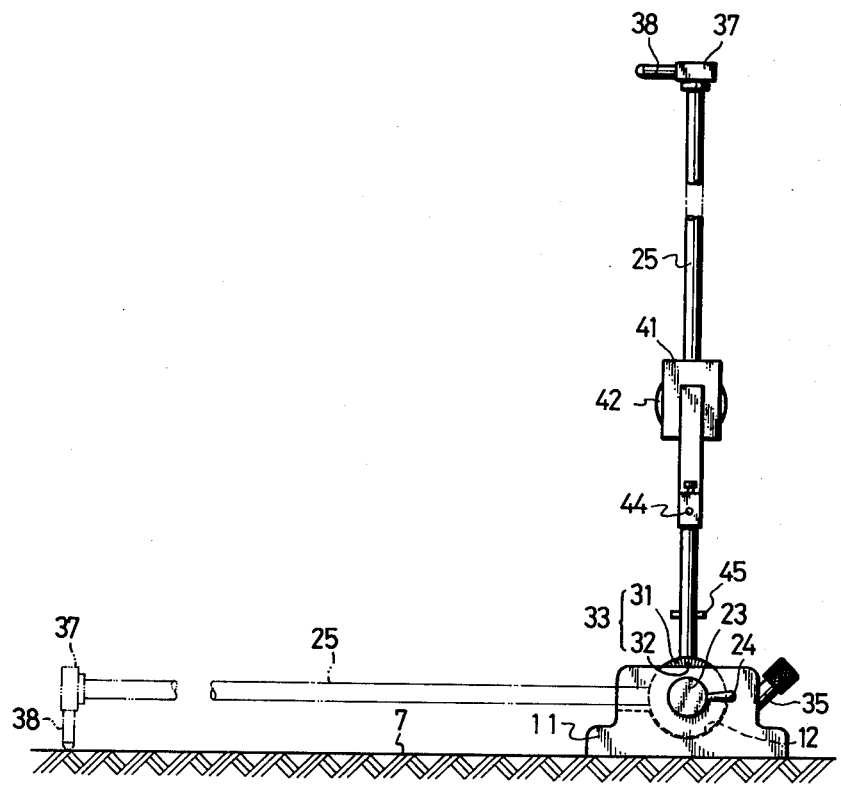
FIG. 3 is a left side view of FIG. 2.

FIGS. 2 and 3 show the first embodiment of the height gauge according to the present invention. In these drawings, a recessed portion 12 having a columnar inner peripheral surface, the central axial line of which is directed in the horizontal direction, is formed in a base 11 rested on a surface plate 7 (refer to FIGS. 4 and 5). This recessed portion 12 is open along the aforesaid axial line at the top end face of the base 11, and first and second relief grooves 13 and 14 are formed in the recessed portion 12 along the circumferential direction with respect to the axial line.

Figure 4:
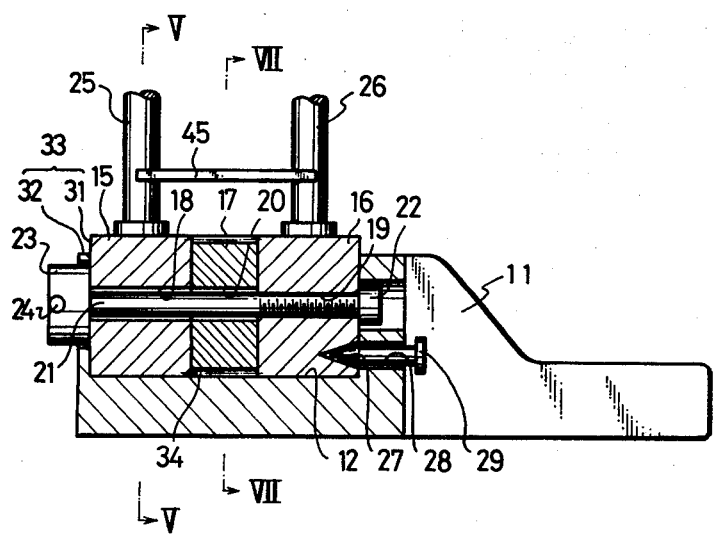
FIG. 4 is an enlarged sectional view showing the construction in a base of the aforesaid embodiment.
Figure 5:
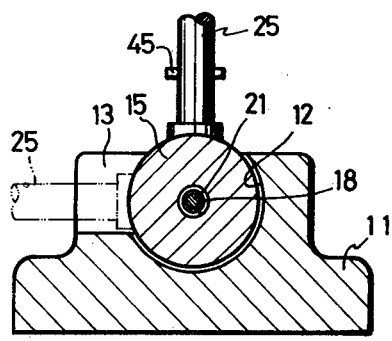
FIG. 5 is a sectional view taken along the line V—V in FIG. 4.

As shown enlarged in FIG. 4, a first rotary member 15, a second rotary member 16 and a third rotary member 17 interposed between the first and the second rotary members 15 and 16 as an adjusting member, all of which have short columnar forms, are separately, rotatably coupled into the recessed portion 12 so as to be aligned on one and the same central axis. These rotary members 15 to 17 are penetratingly provided at respective central axis portions thereof with first to third central holes 18 to 20, through which a locking bolt 21 is inserted from the side of the first rotary member 15.

A sew screw 22 is affixed to the forward end portion of the locking bolt 21. A threaded portion is formed on the peripheral surface of the forward end portion of the locking bolt 21, and this threaded portion is threadably coupled to a threaded portion formed on the peripheral surface of the second central hole 19. Additionally, a handle 24 is secured to a screw head 23 of the locking bolt 21. If this handle 24 is operated to threadably couple the locking bolt 21 into the second rotary member 16, then the first to third rotary members 15 to 17 are brought into pressing contact with one another, whereby the rotary members 15 to 17 are integrated by frictional forces, so that the rotary members 15 to 17 can be integrally rotated.

First and second supports 25 and 26, both of which are formed as round rods, are planted in the first and the second rotary members 15 and 16 respectively. Furthermore, a tapered fixing hole 27 formed parallel to the central axis of the rotary member 17 is formed at a predetermined position on the end face of the second rotary member 16 not in contact with the third rotary member 17. Inserted into this fixing hole 27 is the tapered sharpened forward end portion of a fixing pin 29 coupled onto the base 11 through a coupling hole 28 penetrating through the base 11. When this fixing pin 29 is inserted into the fixing hole 27, the second rotary member 16 can be fixed at an angle causing the second support 26 to become vertical to the surface plate 7 (Refer to FIG. 4).

Figure 6:
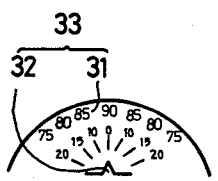
FIG. 6 is an enlarged view showing the arrangement of an angle indicator.

Out of the two opposite end faces of the first rotary member 15, the end face not contacting the third rotary member 17 is provided thereon with a graduated portion 31 for indicating the rotational angle of the first rotary member 15. This graduated portion 31 and the needle 32 provided on the base 11 constitute an angle indicator 33 for indicating the inclination of the supports 25 and 26. As shown in FIG. 6, this angle indicator 33, in the state where the first to third rotary members 15 to 17 are brought into pressing contact with one another and are integrated by means of the locking bolt 21, and the fixing pin 29 is coupled into the fixing hole 27 to cause the supports 25 and 26 to stand up vertically, indicates zero degrees from the vertical base line and 90 degrees from the horizontal base line by means of the needle 32. Furthermore, in the state where the fixing pin 29 is removed from the fixing hole 27 and the first to third rotary members 15 to 17 are rotated through a predetermined angle, the rotational angle, i.e., the inclination of the supports 25 and 26 from the vertical base line and the horizontal base line, are indicated.

Figure 7:
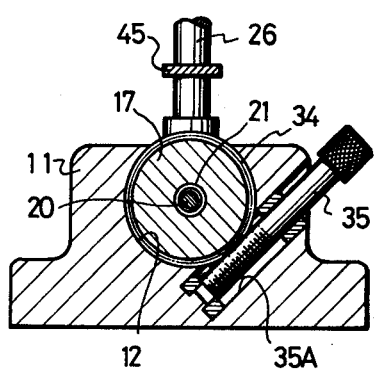
FIG. 7 is a sectional view taken along the line VII—VII in FIG. 4.

As shown in FIG. 7, a gear wheel portion 34 is formed on the outer peripheral surface of the third rotary member 17 and is meshed with an angle adjusting screw 35. This angle adjusting screw 35 is rotatably inserted into an inclined hole 35A penetrating the base 11, and rotation of a screw head of the angle adjusting screw 35 causes the rotary member 17 to rotate commensurate to the rotation of the angle adjusting screw 35.

The angle adjusting screw 35 and the third rotary member 17, which acts as the adjusting member, constitute an angle adjusting device, and the locking bolt 21 and the set screw 22 constitute a locking device.

The first and the second supports 25 and 26, the base portions of which are planted in the first and the second rotary members 15 and 16, are columnar and have identical lengths. The forward end portions of these supports 15 and 16 are affixed to each other by a connecting member 37, so that the supports 25 and 26 can be fixed in parallel to each other (Refer to FIGS. 2 and 3).

A support leg 38 in the form of a round rod having a comparatively short length is projectingly provided at a central position of the side surface of the connecting member 37 in a direction perpendicular to the connecting member 37 and the supports 25 and 26. The forward end portion of this support leg 38, in the state where the supports 25 and 26 are laid down horizontally, vertically abuts against the surface plate 7, so that the supports 25 and 26 can be held horizontally in that state (refer to the chain lines in FIG. 3).

A slider 41 movable in the longitudinal direction of the supports 25 and 26 is slidably supported on the supports 25 and 26. The movement of this slider 41 along the supports 25 and 26, i.e., the vertical movement thereof, is effected by the engagement of a rack, not shown, formed on the support 25 or 26 with a pinion, not shown, incorporated in the slider 41, which pinion is rotated by a handle 42. Additionally, this handle 42 is desirably secured in any one of several different positions on the slider 41, so that suitable selection of the securing position may prevent operation of the handle 42 from being hindered by inclination of the supports 25 and 26.

The displacement of the slider 41 in the longitudinal direction of the supports 25 and 26 is measured by rotation numbers and the like of the rack and the handle 42, and is indicated by a displacement value indicator 43. This indicator 43 is resettable to a zero point, which is a desired selected position on the slider 41, and displacement of the slider 41 from the zero point is indicated in both digital and analogue systems.

Furthermore, secured to one end of the slider 41 is a marking-off pin 44, which can be replaced with scriber having a form similar to the conventional one shown in FIG. 1. A substantially H-shaped connecting plate 45 connects the lower portions of the supports 25 and 26, so that the supports 25 and 26 can be constantly held parallel to each other.

Description will hereunder be given of the action of this embodiment.

Measurements of a height along the vertical base line and marking-off operations along the horizontal base line are performed by a method similar to that used for the conventional height gauge. However, the following method is used when a straight line having a predetermined inclination relative to the horizontal base line is to be scribed.

If the fixing pin 29 is removed and thereafter the handle 24 is operated to loosen the locking bolt 21 in the state where the supports 25 and 26 are suspended along the vertical base line, then the first and the second rotary members 15 and 16 can be rotated separately of each other without being restrained by the third rotary member 17. In consequence, the third rotary member 17 is made unrotatable by the angle adjusting screw 35 meshed with the gear wheel portion 34, but the rotary members 15 and 16 can directly incline the supports 25 and 26 to a desired inclination.

In the state where the supports 25 and 26 are inclined to a predetermined angle, if the locking bolt 21 is tightened, then the first to the third rotary members 15 to 17 are brought into pressing contact with one another again and are integrated, and the supports 25 and 26 are fixed in a position having a predetermined inclination.

If the angle adjusting screw 35 is operated from this state as the graduated portion 31 is observed, the gear wheel portion 34 of the third rotary member 17 meshed with this angle adjusting screw 35 is rotated, whereby the first and the second rotary members 15 and 16, which are in pressing contact with the third rotary member 17, are integrally rotated, so that the inclinations of the supports 25 and 26 can be finely adjusted. In this case, the graduated portion 31 has graduations from both the horizontal base line and the vertical base line.

Upon accurate determination of the inclinations of the supports 25 and 26 as described above, the marking-off pin 44 is abutted against a marking-off surface of the workpiece. Thus, if the handle 42 is operated to move the slider 41 along the supports 25 and 26, then a marking line having a desired inclination is drawn on the marking-off surface. In this case, the workpiece may be left resting on the surface plate as is, and there is no need to incline the workpiece by use of the sine bar or the like.

When a marking-off line along the direction of the horizontal base line is to be drawn, the height gauge together with the base 11 may be caused to slide on the surface plate 7 similarly to the conventional height gauge, or the slider 41 may be caused to slide in a state where the supports 25 and 26 are laid down to a position where the support leg 38 abuts against the surface plate 7, with the base 11 being held stationary on the surface plate 7. In addition, in the aforesaid state where the supports 25 and 26 are laid down, it is possible to accurately index a dimension in the horizontal direction, and consequently, a marking-off operation in the vertical direction can be performed at a very accurate interval base on the aforesaid indexing made in the horizontal direction.

The method of using this embodiment in the case of performing the marking-off operation has been described above. No matter what inclination the supports 25 and 26 may be set at, the displacement value of the slider 41 moving along the supports 25 and 26 is indicated by the displacement value indicator 43, so that measurement of a workpiece in a desired direction may be performed in the same manner as in the case of the marking-off operation.

Furthermore, when a circular arc is to be drawn on a marking-off surface of the workpiece, the supports 25 and 26 may be varied in their inclinations in a state where the slider 41 is affixed at a predetermined position on the supports 25 and 26, with the marking-off pin 44 being abutted against the marking-off surface.

This embodiment can offer the following advantages.

A marking line in a desired direction ranging from the vertical, base line to the horizontal base line can be drawn as the workpiece directly rests on the surface plate 7, without a need for changing the rest position of the workpiece, and measurements of dimensions in desired directions, including the horizontal direction can be performed.

Further, in the above-described case, such marking-off operations and measurements of dimensions are performed very simply and quickly with high accuracy without requiring devices for indexing angles and dimensions, such as a sine bar and a rule, at all.

There have been some cases where difficulties were encountered in peforming necessary marking-off operations and measurements which depend on the configuration of the workpiece due to the difficulties in installing the workpiece in a desirable mode on a surface plate, a sine bar or the like. However, with this embodiment, even in such cases, necessary marking-off operations and measurements can be quickly performed.

Furthermore, when the supports 25 and 26 are to be held at predetermined inclinations, due to the presence of the two step adjusting means, including (1) the means for adjusting the inclinations to a considerable extent, in which the locking bolt 23 is loosened by means of the handle 24 to incline the supports 25 and 26, and (2) the means for fine adjustment, in which the locking bolt 23 is tightened again and thereafter fine adjustment is performed by means of the angle adjusting screw 35, the advantage of quickly and accurately performing adjustment can be offered no matter what inclinations the supports 25 and 26 may be set at.

Additionally, the presence of the support leg 38 makes it possible to perform the marking-off operations and measurements in the horizontal direction in a very stable condition.

Furthermore, since the supports 25 and 26 for supporting the slider 41 are constituted by two columnar members, the supports 25 and 26 have constant ridigity no matter how they may be inclined, thus enabling accurately marking-off operations and measurements.

Further, the fixing pin 29 is inserted into the fixing hole 27, so that the supports 25 and 26 can be easily and accurately held perpendicular to the surface plate 7 without requiring observation of the graduated portion 31.

Description will now be given of other embodiments of the present invention. Like reference numerals of the above-described first embodiment are used to designate the same or similar parts, so that description thereof will be omitted or simplified.

Figure 8:
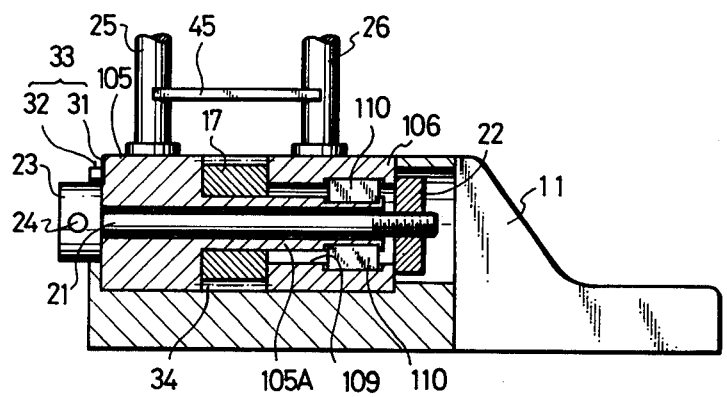
FIG. 8 is a sectional view showing the construction in the base of a second embodiment of the height gauge according to the present invention.

FIG. 8 shows the essential portions of the second embodiment. In this drawing, a small diameter cylindrical projection 105A which project toward a second rotary member 106 is formed on a first rotary member 105. This projection 105A extends into a second center hole 109, and is connected to the second center hole 109 through a plurality of sliding keys 110. With this arrangement, the first and the second rotary members 105 and 106 can be integrally rotated at all times.

Furthermore, a locking bolt 21 and a set screw 22 constitute a locking device. This bolt 21 is threadably coupled to the set screw 22 locked against rotating on the base 11, and, in a state where the locking bolt 21 is tightened, the first and the second rotary members 105 and 106 are frictionally engaged with a third rotary member 17 which acts as the adjusting member.

In the second embodiment with the above-described structure, the respective base portions of the supports 25 and 26 are simultaneously rotated at all times.

In consequence, the supports 25 and 26, being held in parallel to each other at four positions by the connecting member 37 at the forward ends, the slider 41 at the intermediate positions, the connecting plate 45 at the lower portions and the first and the second rotary members 105 and 106 at the base portions, can offer further accurate marking-off operations and measurements, and moreover, smoother inclining of the supports 25 and 26 and subsequent smoother movement of the slider 41.

In the above-described first and second embodiments, the supports are constituted by two columnar members, however, the number of supports may be one or more than three. In addition, the form of the supports should not necessarily be limited to columnar form, but may be in form of the prism or flat plate.

Description has been given of the supports 25 and 26 being inclined from the vertical position to only one side. However, the supports 25 and 26 may be inclined not only to one side, but to both sides, and a plurality of support legs 38 of the connection member 37 may be projected from opposite sides of the connecting member 37.

Further, description has been given that the rotary members 15, 16 and 17, into which the base portions of the supports 25 and 26 are planted, are rotated about one and the same axis, have columnar forms and are adjusted by two steps. However, the forms of the rotary members should not necessarily be limited to the columnar forms, but may be ones rotatable in all directions such as spheres, i.e., ones allowing non-axis rotation. Additionally, two-step adjustment should not necessarily be required for the device, and one step or a multi-step adjustment may be adopted.

Furthermore, the first and the second rotary members 15, 105, 16 and 106 are rotated by the screw feed means only when these rotary members are clamped by the locking bolt 21 and frictionally engaged with the third rotary member 17 as an adjusting member. However, the first to the third rotary members 15, 105, 16, 106 and 17 may be integrally formed and made rotatable by the screw feed means as a whole at all times. In this case, the gear wheel portion 34 formed on the third rotary member 17 and the adjusting screw 35 provided on the base 11 constitute the locking device.

Additionally, a construction may be adopted wherein the aforesaid angle adjusting device is not provided. In particular, the first and the second rotary members 15, 105, 16 and 106 are integrally formed, and further, the locking bolt 21 is threadably coupled to the base 11 to frictionally engage the rotary members thus integrally formed with the base 11 in a suitable manner. In this case, the locking bolt 21 threadably coupled to the base 11 constitutes the locking means.

When the fixing pin 29 is coupled into the fixing hole 27, the supported 25 and 26 are vertically affixed to the base 11. However, an arrangement may be adopted wherein one or a plurality of fixing holes 27 are previously penetratingly provided at a predetermined position or positions on the rotary member 16 in the rotating direction of the rotary member 16. The fixing pin 29 is coupled into the fixing hole or one of the fixing holes 27, so that the supports 25 and 26 can be held in the preset inclination. In this case, the fixing hole 27 and the fixing pin 29 constitute the locking means.

Furthermore, the rotational angle of the rotary member 15, i.e., the inclinations of the supports 25 and 26, are indicated by the graduated portion 31 and the needle 32. However, the angle indicator should not necessarily be limited to this arrangement, for example, and a system wherein the inclination is measured electrically or mechanically and the thus measured valve is indicated at another location may be adopted. In this case, the measured value is referenced from the horizontal base line, the vertical base line of any desired angle, and an angle of displacement from the reference which may be suitably changed as necessary for indication.

Description has been given that the slider 41 is moved by means of the handle 42. However, the slider 41 may be directly, manually operated.

Further, the angle adjusting screw 35 meshed with the gear wheel portion 34 should not necessarily be worm gear-shaped, but may be pinion-shaped, for example.

In the above-described second embodiment, the forward end portion of the locking bolt 21 is threadably coupled to the nut 22, but may be threadably coupled to a small diameter portion formed on a portion of the second central hole 109 of the second rotary member 106.

Figure 9:
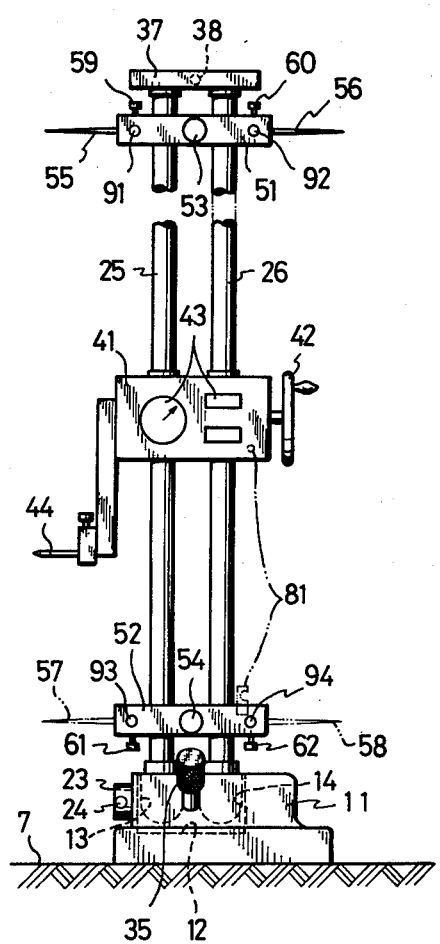
FIG. 9 is a front view showing the general arrangement of a third embodiment.
Figure 10:
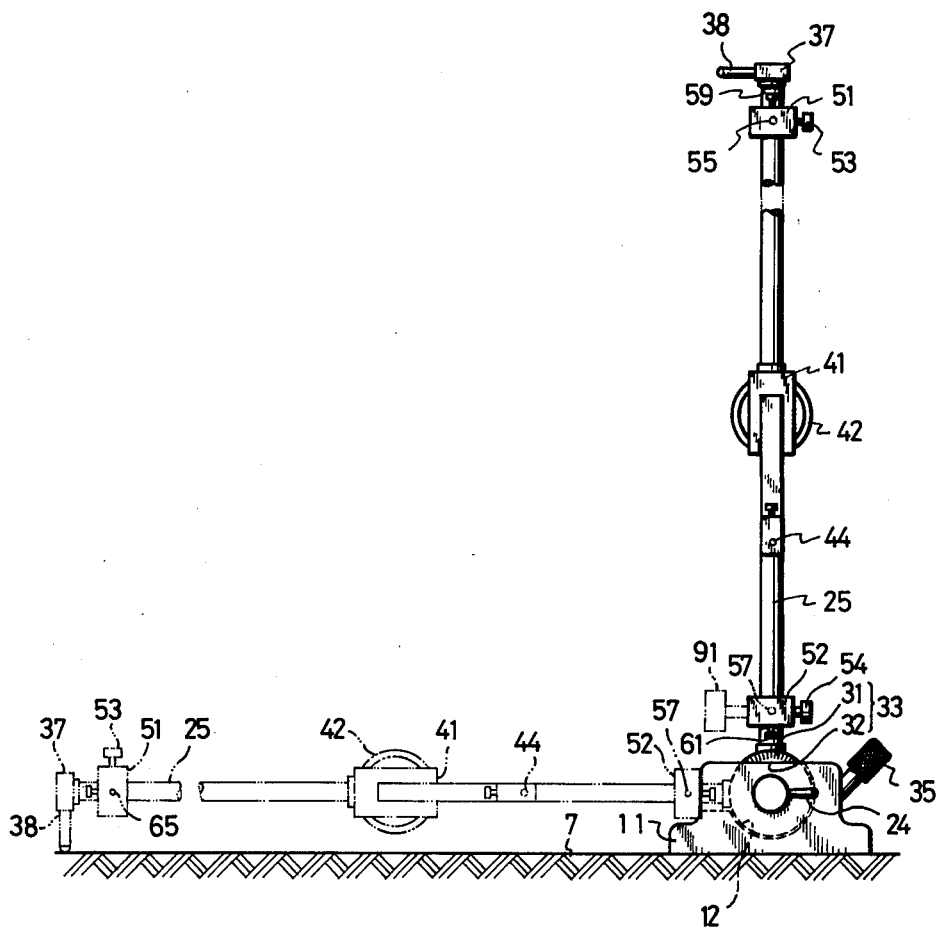
FIG. 10 is a left side view of FIG. 9.

FIGS. 9 and 10 show the third embodiment. In these drawings, first and second retainer members 51 and 52, which are sliders having a marking-off pin detachably secured thereto, are slidably provided on the supports 25 and 26 upwardly and downwardly of the slider 41. These retainer members 51 and 52 are adapted to be quickly movable along the supports 25 and 26, and are provided thereon with lock screws 53 and 54 as first engaging devices, so that the retainer members 51 and 52 can be engaged with the supports 25 and 26 at suitable positions thereon.

Furthermore, the retainer members 51 and 52 are detachably provided thereon with marking-off pins 55, 56, 57 and 58 through set screws 59, 60, 61 and 62 in such a manner that the marking-off pins project in directions perpendicular to the longitudinal directions of the supports 25 and 26. Further, the retainer members 51 and 52 are formed therein with marking-off pin mounting holes 91, 92, 93 and 94 for mounting the marking-off pins in such a manner that the marking-off pins project in directions perpendicular to the surface of the drawing in FIG. 9 and out of the page. The set screws 59, 60, 61 and 62 can fix the base portions of the respective marking-off pins, even when the marking-off pins are inserted into the marking-off pin mounting holes 91, 92, 93 and 94. In addition the retainer members 51 and 52 are also formed therein with marking-off pin mounting holes for mounting the marking-off pins in such a manner that the marking-off pins are projected in directions perpendicular to the surface of the drawing in FIG. 9 and into the page.

Description will hereunder be given of action of this embodiment.

In this embodiment, the marking-off operations and measurements by use of the slider 41 are performed in the same manner as in the aforesaid first embodiment. However, it is convenient to exclusively use the retainer members 51 and 52 in the marking-off operations. More specifically, there is no need of going so far as to move the slider 41 by means of the handle 42. The retainer members 51 and 52, to which are secured the marking-off pins 55 and 58 as necessary, are directly gripped and moved along the supports 25 and 26, whereby the marking-off work is far more quickly performed than by the use of the slider 41. In this case, the retainer members 51 and 52 are detachably provided on the supports 25 and 26 in the longitudinal directions of the supports 25 and 26 and on opposite sides of the slider 41, and the marking-off operation is not restricted in movement no matter what positions the slider 41 may be engaged with the supports 25 and 26 at.

In addition, the marking-off pins 55 to 58 on the retainer members 51 and 52 are detachable, so that they cay be removed when deemed unnecessary. Furthermore, the retainer members 51 and 52 are engageable with the supports 25 and 26 at desirable positions thereon through the lock screws 53 and 54. Consequently, if the slider 41 is to be exclusively or additionally used, the retainer members 51 and 52 should be engaged with the supports 25 and 26 at suitable positions such as at opposite ends thereof.

The embodiment with the above-described arrangement can offer the following advantages.

Since the retainer members 51 and 52 are provided separately of the slider 41, marking-off operations can be quickly performed by use of these retainer members 51 and 52.

Since the marking-off pins 55 to 58 can be selectively mounted to the retainer members 51 and 52 in a manner to project in directions perpendicular to the surface of the drawing, into or out of the page, in addition to the horizontal directions to the right as well as to the left, and moreover, these marking-off pins 55 to 58 can be adjusted in their degree of projection when mounted, the marking-off operations can be facilitated and difficulties in handling caused by the presence of unnecessary marking-off pins can be avoided.

Figure 11:
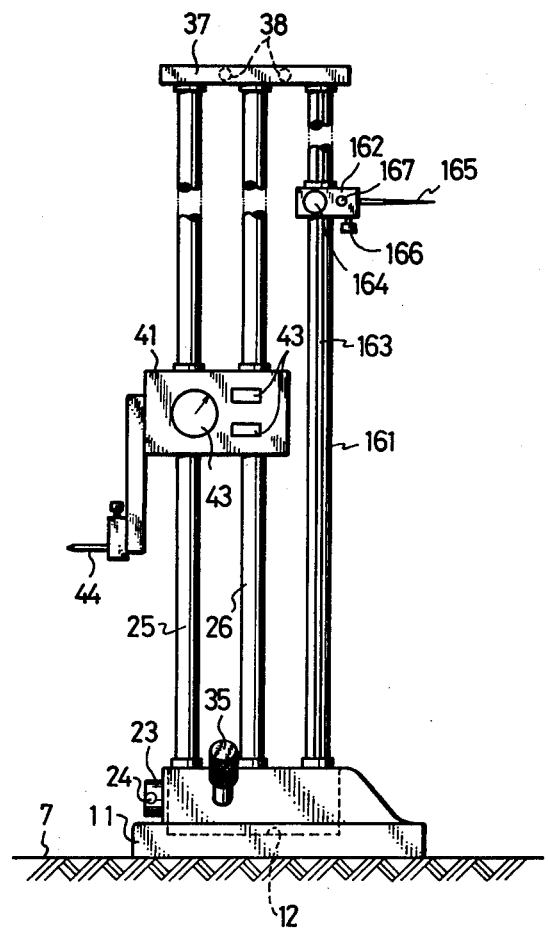
FIG. 11 is a front view showing the general arrangement of a fourth embodiment.

FIG. 11 shows the general arrangement of the fourth embodiment. In this drawing, the base 11 is provided with a third support 161 disposed in parallel to the supports 25 and 26 in addition to the supports 25 and 26. Slidably supported through a keyway 163 on this third support 161 in the longitudinal direction thereof is a retainer member 162 which functions as a slider, and marking-off pins are detachably provided thereon in a manner which prevents them from rotating in the circumferential direction of the support 161. Additionally, the retainer member 162 is adapted to be engageable with the support 161 at a desired position on the support 161 through a lock screw 164 which acts as a first engaging mechanism. A marking-off pin 165 is mounted through internal threads to one end of the retainer member 162 in a manner to be detachable and adjustable in degree projection, and further, the retainer member 162 is formed therein with a marking-off pin mounting hole 167 for mounting a marking-off pin to be projected in a direction perpendicular to the surface of the drawing in FIG. 11 out of the page, and the marking-off pin inserted into this mounting hole 167 is also mounted through a set screw 166 in a manner to be adjustable in projecting value.

Figure 12:
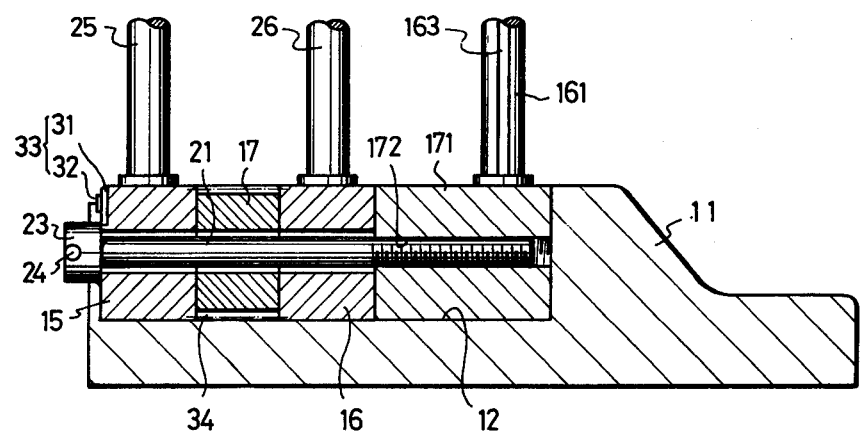
FIG. 12 is an enlarged sectional view showing the construction in the base of the aforesaid fourth embodiment.

As shown in FIG. 12, the base portion of the third support 161 is planted in a fourth rotary member 171 of a columnar form, which is threadably coupled at a central hole 172 thereof to the forward end portion of the locking bolt 21, and frictionally engaged with the first to third rotary members 15 to 17 in a suitable manner through the operation of the handle 24 or the screw head 23. Here, the locking bolt 21 and the central hole 172 constitute a locking device.

Additionally, the top end portion of the third support 161 is fixed by the connecting member 37 so as to be held parallel to the supports 25 and 26.

Description will now be given of action of this embodiment.

In this embodiment, the third support 161 is provided separately of the supports 25 and 26. This third support 161 is held parallel to the supports 25 and 26 at all times, including when the supports 25 and 26 are inclined, and can be inclinded and fixed through an operation similar to the operation of inclining and fixing the supports 25 and 26 in the aforesaid first to third embodiments.

The embodiment with the above-described arrangement can offer the following advantages.

Since the support 161 exclusively used for the retainer member 162 is provided separately of the supports 25 and 26 supporting the slider 41, when the retainer member 162 is moved along the support 161, the slider 41 does not interfere therewith, and consequently, the marking-off operations can be performed more easily than in the aforesaid third embodiment, and at a very high speed.

Since the support 161 is formed with the keyway or groove 163, the marking-off pin 165 can not be carelessly shaken from its projecting direction, thus enabling it to draw a stable marking-off line.

Moreover, there is no possibility of damaging the racks, not shown, formed on the supports 25 and 26, with the retainer member 162.

In addition, in the above-described third and fourth embodiments, the first engaging mechanism is constituted by the lock screws 53, 54 or 164. However, the function of the engaging mechanism should not necessarily be limited to the locking by use of the screw mechanism, and any other mechanism, such as pressing means using a sheet spring or the like, may be used.

Further, an arrangement may be adopted wherein a second engaging mechanism comprising a pawl having biasing means, a set screw 81 and the like is provided in addition to the aforesaid first engaging mechanism, and the retainer members 51, 52 or 162 are engaged with the slider 41 by use of this second engaging mechanism, whereby the slider 41 is operated to control the retainer members 51, 52 or 162 (refer to FIG. 9). In addition, when the retainer members 51, 52 or 162 are moved separately of the slider 41, the retainer member 51, 52 or 162 may be directly gripped and operated. Handles 91 may be provided for operating the retainer members 51, 52 and 162, respectively (refer to FIG. 10).

As has been described hereinabove, the present invention can provide a height gauge having a novel function, capable of performing marking-off operations and measurements of dimensions in desired inclined directions.

What is claimed is:

1. A height gauge comprising:
   a base;
   a first substantially columnar member rotatably mounted on said base;
   a first elongated support having a base portion supported on said first substantially columnar member;
   a first slider slidably supported on said first support;
   a displacement value indicator which indicates the degree of displacement of said first slider along said first degree of displacement of said first slider along said first support;
   an angle adjusting device for positively rotating said first substantially columnar member and thereby for adjusting the inclination of said first support, comprising a gear wheel and an adjusting device drive means both rotatably mounted on said base, which drive means engages said gear wheel;
   a locking device actuable for preventing said first columnar member from freely rotating and thereby for holding said first support at desired inclinations, said locking device comprising a locking bolt for clamping said gear wheel and said first substantially columnar member together in frictional engagement; and
   an angle indicator which indicates the inclination of said first support.

2. A gauge as claimed in claim 1, including a second substantially columnar member, said first and second substantially columnar members being disposed along the axial direction of said locking bolt at opposite ends of said gear wheel, said locking bolt being actuable for fixing said first and second substantially columnar members to said gear wheel for rotation with the latter, and a second elongated support having a base portion supported on said second substantially columnar member, said first slider being mounted on both of said first and second supports for lengthwise movement therealong.

3. A gauge as claimed in claim 2, wherein said first and second supports are elongate cylindrical members.

4. A gauge as claimed in claim 1, wherein said locking bolt extends through a first bore in said first substantially columnar member and a second bore formed in said gear wheel, said second bore being coaxial with said first bore, and said gauge further comprises means defining a third bore which is threaded and which is coaxial with said first and second bores, said locking bolt being threadedly coupled to said means defining said third bore.

5. A gauge as claimed in claim 4, further comprising a second slider mounted on said first support for lengthwise movement therealong, said first slider having means for measuring dimensions of a workpiece, and said second slider having a marking-off pin mounted thereon for measuring and marking the workpiece.

6. A gauge as claimed in claim 4, further comprising a second substantially columnar member rotatably mounted on said base, said second substantially columnar member being clamped by said locking device in an end-to-end relationship with said gear wheel for common integral rotation with said gear wheel and said first substantially columnar member, a second elongated support mounted on said second substantially columnar member and extending radially therefrom, and a second slider mounted on said second support for lengthwise movement therealong, one of said first and second sliders having a measuring head adapted for measuring dimensions of a workpiece, and the other of said first and second sliders having a marking-off pin mounted thereon for measuring and marking the workpiece, said first and second sliders being adapted for slidable movement along the associated supports independently of each other.

7. A gauge as claimed in claim 1, further comprising a handle formed on an exposed end of said locking bolt and adapted to facilitate rotation of said locking bolt.

8. A gauge as claimed in claim 1, wherein said angle indicator comprises a graduated scale provided on said first substantially columnar member and an indicator needle provided on said base.

9. A gauge as claimed in claim 8, wherein said graduated scale indicates both the angle of inclination of said first support from a horizontal base line and the angle of inclination of said first support from a vertical base line.

10. A gauge as claimed in claim 1, wherein said first support has a support leg formed thereon near its end remote from said first substantially columnar member, said support leg extending perpendicular to the lengthwise axis of said first support.

11. A gauge as claimed in claim 1, wherein said first support is an elongate cylindrical member.

12. A gauge as claimed in claim 1, in which said adjusting device drive means comprises a pinion.

13. A gauge as claimed in claim 1, in which said adjusting device drive means comprises a screw.

14. A height gauge comprising:
a base;
at least one substantially columnar member rotatably mounted on said base;
a plurality of supports having base portions each supported on a said substantially columnar member;
a slider slidably supported on said supports for lengthwise movement therealong, said slider having measuring means thereon for measuring a workpiece;
a displacement indicator which indicates the degree of displacement of said slider along said supports;
an angle adjusting device for adjusting the inclination of said supports by forcedly rotating said substantially columnar member, and a locking device cooperable therewith for selectively permitting or preventing relative rotation between said substantially columnar member and said angle adjusting device, so as to enable said supports to be held at a desired inclination;
a fixing hole in said substantially columnar member and a fixing pin coupled to said base and insertable into said fixing hole for holding said supports and said substantially columnar member at a predetermined inclination;
an angle indicator for indicating the inclination of said supports;
said supports being of columnar form and arranged parallel to each other and orientable in a direction to permit movement of the slider thereon to bring the measuring means into engagement with a workpiece, said columnar supports being tiltable through about 90° in opposite directions from a vertical position and about an axis perpendicular to said supports.

* * * * *